United States Patent

Song et al.

(10) Patent No.: US 9,214,185 B1
(45) Date of Patent: Dec. 15, 2015

(54) ADAPTIVE FILTER-BASED NARROWBAND INTERFERENCE DETECTION, ESTIMATION AND CANCELLATION

(71) Applicant: LSI Corporation, San Jose, CA (US)

(72) Inventors: Xiufeng Song, San Jose, CA (US); George Mathew, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/318,666

(22) Filed: Jun. 29, 2014

(51) Int. Cl.
*G11B 5/035* (2006.01)
*G11B 20/10* (2006.01)
*H04L 25/08* (2006.01)
*H04B 1/12* (2006.01)

(52) U.S. Cl.
CPC .......... *G11B 20/10046* (2013.01); *H04B 1/123* (2013.01); *H04L 25/08* (2013.01)

(58) Field of Classification Search
None
See application file for complete search history.

(56) References Cited

U.S. PATENT DOCUMENTS

| | | | | |
|---|---|---|---|---|
| 4,349,916 A * | 9/1982 | Roeder | .................... | 375/349 |
| 4,743,871 A * | 5/1988 | Searle | ...................... | 333/166 |
| 5,388,160 A * | 2/1995 | Hashimoto et al. | ........ | 381/71.14 |
| 5,812,615 A * | 9/1998 | Baum et al. | ................ | 375/344 |
| 6,052,420 A * | 4/2000 | Yeap et al. | ................ | 375/346 |
| 6,285,718 B1 * | 9/2001 | Reuven | .................... | 375/257 |
| 6,535,553 B1 | 3/2003 | Limberg et al. | | |
| 6,631,165 B1 * | 10/2003 | Lambert et al. | ............ | 375/259 |
| 7,035,796 B1 * | 4/2006 | Zhang et al. | ................ | 704/226 |
| 7,248,630 B2 | 7/2007 | Modrie | | |
| 7,257,764 B2 | 8/2007 | Suzuki | | |
| 7,421,017 B2 | 9/2008 | Takatsu | | |
| 7,453,963 B2 * | 11/2008 | Joublin et al. | .............. | 375/346 |
| 7,502,189 B2 | 3/2009 | Sawaguchi | | |
| 7,715,471 B2 | 5/2010 | Werner | | |
| 8,018,360 B2 | 9/2011 | Nayak | | |
| 8,046,666 B2 | 10/2011 | Park et al. | | |
| 8,208,213 B2 | 6/2012 | Liu | | |
| 8,604,960 B2 | 12/2013 | Liao | | |
| 8,767,333 B2 | 7/2014 | Xia | | |
| 2004/0212913 A1 * | 10/2004 | Jung et al. | ...................... | 360/75 |
| 2005/0276363 A1 * | 12/2005 | Joublin et al. | .............. | 375/350 |
| 2006/0114601 A1 * | 6/2006 | Semba et al. | ............. | 360/78.09 |
| 2006/0123285 A1 | 6/2006 | De Araujo | | |
| 2006/0252405 A1 * | 11/2006 | Matz et al. | ................ | 455/402 |
| 2008/0170322 A1 * | 7/2008 | Konishi | ...................... | 360/77.02 |
| 2008/0224792 A1 * | 9/2008 | Nielsen | ........................ | 333/17.1 |
| 2008/0285170 A1 * | 11/2008 | Uchida et al. | .............. | 360/77.02 |
| 2009/0002862 A1 | 1/2009 | Park et al. | | |
| 2009/0073601 A1 * | 3/2009 | Uchida et al. | ............. | 360/77.04 |
| 2009/0096517 A1 * | 4/2009 | Huang et al. | ................ | 327/556 |
| 2009/0296265 A1 * | 12/2009 | Kisaka et al. | .................. | 360/75 |
| 2010/0067621 A1 | 3/2010 | Noeldner | | |
| 2011/0069411 A1 * | 3/2011 | Uchida et al. | .............. | 360/77.04 |

(Continued)

OTHER PUBLICATIONS

Mehala, "IIR Multiple Notch Filter Design for Power Line Interference Removal", IJESE vol. 1, Issue 10, Aug. 2013.

(Continued)

*Primary Examiner* — Peter Vincent Agustin (57) ABSTRACT

A data processing system includes an adaptive notch filter operable to estimate an interference frequency in data samples, a convergence detector operable to determine whether the interference frequency converges on a value, indicating that the data samples contain interference, and an interference removal circuit operable to remove interference detected by the adaptive notch filter from the data samples.

20 Claims, 6 Drawing Sheets

(56) References Cited

U.S. PATENT DOCUMENTS

| | | |
|---|---|---|
| 2011/0072335 A1 | 3/2011 | Liu et al. |
| 2011/0075569 A1 | 3/2011 | Marrow |
| 2011/0164332 A1 | 7/2011 | Cao |
| 2011/0167227 A1 | 7/2011 | Yang et al. |
| 2012/0019946 A1 | 1/2012 | Aravind |
| 2012/0056612 A1 | 3/2012 | Mathew |
| 2012/0069891 A1 | 3/2012 | Zhang |
| 2012/0124119 A1 | 5/2012 | Yang |
| 2012/0131405 A1* | 5/2012 | Licona et al. ............. 714/746 |
| 2012/0236430 A1 | 9/2012 | Tan |
| 2013/0054664 A1 | 2/2013 | Chang |
| 2013/0097213 A1 | 4/2013 | Liao |
| 2014/0233129 A1* | 8/2014 | Xiao et al. ............. 360/39 |

OTHER PUBLICATIONS

U.S. Appl. No. 14/136,051, filed Dec. 20, 2013, Yu Liao, Unpublished.

U.S. Appl. No. 14/029,559, filed Sep. 17, 2013, Rui Cao, Unpublished.

U.S. Appl. No. 13/912,171, filed Jun. 6, 2013, Lu Lu, Unpublished.

U.S. Appl. No. 13/912,159, filed Jun. 6, 2013, Jin Lu, Unpublished

U.S. Appl. No. 13/777,915, filed Feb. 26, 2013, Jun Xiao, Unpublished.

U.S. Appl. No. 13/742,336, filed Jan. 15, 2013, Jianzhong Huang, Unpublished.

U.S. Appl. No. 13/597,046, filed Aug. 28, 2012, Lu Pan, Unpublished.

U.S. Appl. No. 13/551,507, filed Jul. 17, 2012, Ming Jin, Unpublished.

U.S. Appl. No. 13/346,556, filed Jan. 9, 2012, Haitao Xia, Unpublished.

U.S. Appl. No. 13/562,140, filed Jul. 30, 2012, Haotian Zhang, Unpublished.

U.S. Appl. No. 13/525,188, filed Jun. 15, 2012, Yang Han, Unpublished.

U.S. Appl. No. 13/491,062, filed Jun. 7, 2012, Jin Lu, Unpublished.

U.S. Appl. No. 13/525,182, filed Jun. 15, 2012, Yang Han, Unpublished.

* cited by examiner

ADAPTIVE FILTER-BASED NARROWBAND INTERFERENCE DETECTION, ESTIMATION AND CANCELLATION

FIELD OF THE INVENTION

Various embodiments of the present invention provide systems and methods for data processing, and more particularly to systems and methods for cancelling interference in a data processing system.

BACKGROUND

Various data processing systems have been developed including storage systems, cellular telephone systems, and radio transmission systems. In such systems data is transferred from a sender to a receiver via some medium. For example, in a storage system, data is sent from a sender (i.e., a write function) to a receiver (i.e., a read function) via a storage medium. As information is stored and transmitted in the form of digital data, errors are introduced that, if not corrected, can corrupt the data and render the information unusable. The effectiveness of any transfer is impacted by any losses in data caused by various factors. Many types of error correction systems have been developed to detect and correct errors in digital data, encoding the data by the sender and decoding in the receiver to recover the originally written data. However, noise in the data increases the errors to be detected and corrected by the data processing system.

SUMMARY

Various embodiments of the present invention provide systems and methods for data processing, and more particularly to systems and methods for cancelling interference in a data processing system.

A data processing system is disclosed including an adaptive notch filter operable to estimate an interference frequency in data samples, a convergence detector operable to determine whether the interference frequency converges on a value, indicating that the data samples contain interference, and an interference removal circuit operable to remove interference detected by the adaptive notch filter from the data samples.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components.

DETAILED DESCRIPTION OF THE INVENTION

Various embodiments of the present invention provide systems and methods for data processing, and more particularly to systems and methods for cancelling interference in a data processing system.

Various embodiments of the present invention provide data processing systems. The data processing systems include an adaptive infinite impulse response (IIR) notch filter-based narrowband interference detection and removal circuit to detect, estimate and remove narrowband sinusoidal interference in data. In some embodiments, the sinusoidal interference is detected and removed from digital X samples. As used herein, the term "X sample" corresponds to a data sample derived from the output of an analog to digital converter circuit prior to equalization.

In some embodiments, the detection and estimation of narrowband interference is based on X samples. In some other embodiments, the detection and estimation is based on X errors, or the difference between X samples and ideal values for the X samples. In some other embodiments, the input can be varied to use either X samples or X errors.

In some embodiments, the IIR notch filter used to detect and estimate narrowband sinusoidal interference has a lattice structure, providing good estimation accuracy and numerical stability.

In some embodiments, a convergence detector analyzes the estimate of the interference frequency provided by the interference detector to determine whether the data includes narrowband interference to be removed. Where narrowband interference exists in the data, the estimate of the interference frequency will converge on the frequency of the sinusoidal interference. Where the data is substantially free of narrowband sinusoidal interference, the estimated of the interference frequency will not converge on a particular frequency.

The narrowband sinusoidal interference detected and estimated by the adaptive IIR notch filter-based detection and removal circuit is characterized by several qualities in some embodiments—the data processing system does not know whether the sinusoidal interference exists in the data, when it will occur or the frequency of the sinusoidal interference, if any. The adaptive IIR notch filter-based detection and removal circuit thus performs blind interference removal, meaning that it detects whether sinusoidal interference exists in the data, estimates the frequency of the sinusoidal interference and removes it when it exists.

Figure 1:
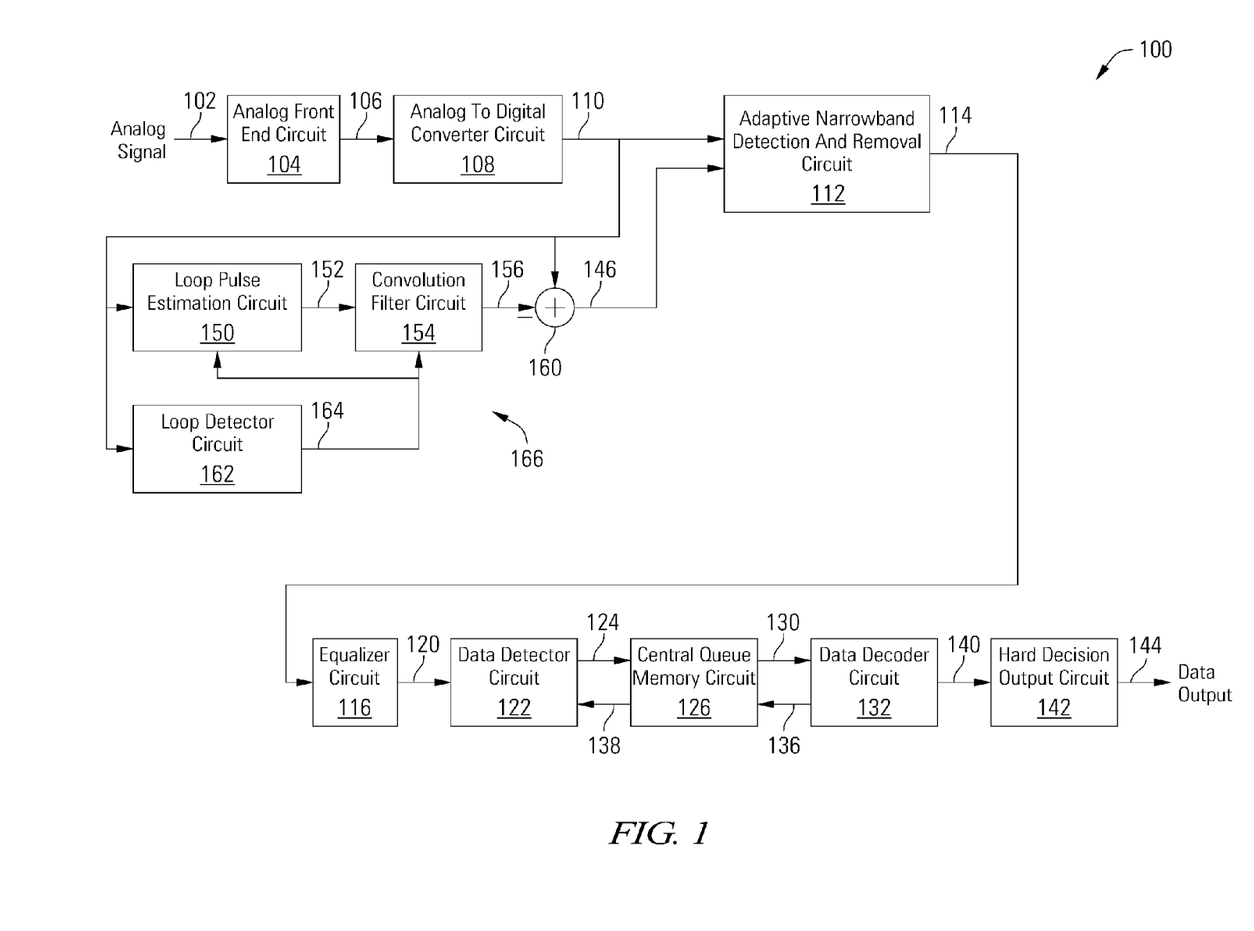
FIG. 1 shows a read channel including an adaptive notch filter-based narrowband interference detection and removal circuit in accordance with some embodiments of the present invention.

Although the data processing system with adaptive IIR notch filter-based narrowband interference detection and removal disclosed herein is not limited to any particular application, a read channel 100 is depicted in FIG. 1 that benefits from embodiments of the present invention. Turning to FIG. 1, data processing circuit 100 includes an analog front end circuit 104 that receives an analog signal 102. Analog front end circuit 104 processes analog signal 102 and provides a processed analog signal 106 to an analog to digital converter circuit 108. Analog front end circuit 104 may include, but is not limited to, an analog filter and an amplifier circuit as are known in the art. Based upon the disclosure provided herein, one of ordinary skill in the art will recognize a variety of circuitry that may be included as part of analog front end circuit 104. In some cases, analog input signal 102 is derived from a read/write head assembly (not shown) that is disposed in relation to a storage medium (not shown). In other cases, analog signal 102 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog signal 102 may be derived.

Analog to digital converter circuit 108 converts processed analog signal 106 into a corresponding series of digital samples 110, or X samples. Analog to digital converter circuit 108 can be any circuit known in the art that is capable of producing digital samples corresponding to an analog input signal. Based upon the disclosure provided herein, one of ordinary skill in the art will recognize a variety of analog to digital converter circuits that can be used in relation to different embodiments of the present invention. Digital samples 110 are provided to an adaptive IIR notch filter-based narrowband detection and removal circuit 112 that detects sinusoidal interference in digital samples 110, estimates the frequency of the sinusoidal interference, if any, and removes the sinusoidal interference, if any, from the digital samples 110, yielding clean digital samples 114.

Clean digital samples 114 are provided to an equalizer circuit 116. Equalizer circuit 116 applies an equalization algorithm to clean digital samples 114 to yield an equalized output 120. In some embodiments of the present invention, equalizer circuit 116 is a digital finite impulse response filter circuit as are known in the art. Equalized output 120 is provided to a data detector circuit 122, which produces a detected output 124 by applying a data detection algorithm to the data input. In some embodiments, the data detection algorithm can be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention.

Detected output 124 is provided to a central queue memory circuit 126 that operates to buffer data passed between data detector circuit 122 and a data decoder circuit 132. When data decoder circuit 132 is available, data decoder circuit 132 receives detected output 124 from central queue memory 126 as a decoder input 130. Data decoder circuit 132 applies a data decoding algorithm to decoder input 130 in an attempt to recover originally written data. The result of the data decoding algorithm is provided as a decoded output 136. Data decoder circuit 132 can be any data decoder circuit known in the art that is capable of applying a decoding algorithm to a received input. Data decoder circuit 132 can be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 132 provides the result of the data decoding algorithm as a data output 140. Data output 140 is provided to a hard decision output circuit 142 where the data is reordered before providing a series of ordered data sets as a data output 144.

One or more iterations through the combination of data detector circuit 122 and data decoder circuit 132 can be made in an effort to converge on the originally written data set. As mentioned above, processing through both the data detector circuit 122 and the data decoder circuit 132 is referred to as a "global iteration". For the first global iteration, data detector circuit 122 applies the data detection algorithm without guidance from a decoded output. For subsequent global iterations, data detector circuit 122 applies the data detection algorithm to the input data as guided by decoded output 136. Decoded output 136 is received from central queue memory 126 as a detector input 138.

In some embodiments of the read channel 100, the adaptive IIR notch filter-based narrowband detection and removal circuit 112 detects sinusoidal interference in digital samples 110 and estimates the frequency of the sinusoidal interference based on X errors 146 rather than X samples 110. In these embodiments, the adaptive IIR notch filter-based narrowband detection and removal circuit 112 can detect and converge on any sinusoidal interference with better accuracy with longer latency. X errors 146 can be obtained or generated in read channel 100 in any suitable manner. In some embodiments, an X error calculation circuit 166 includes a loop pulse estimation circuit 150, a convolution filter circuit 154, a summation circuit 160, and a loop detector circuit 162. In operation, convolution filter circuit 154 receives a detected output 164 from loop detector circuit 162. Loop detector circuit 162 can be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. The convolution filter circuit 154 also receives an X target 152 or partial response target from the loop pulse estimation circuit 150, which generates the partial response target based on the X samples 110 and on actual values for X samples 110 as represented by detected output 164. Loop pulse estimation circuit 150 can be any circuit known in the art that is capable of processing X samples 110 and corresponding actual values in detected output 164 to derive a partial response target. Based upon the disclosure provided herein, one of ordinary skill in the art will recognize a variety of loop pulse estimation circuits that can be used in relation to different embodiments of the present invention.

Convolution filter circuit 154 can be any circuit known in the art that is capable of applying target based filtering to an input signal to yield an output conformed to a target. In this case, convolution filter circuit 154 applies target based filtering to detected output 164 to yield a target filtered output 156, using the X target 152 from loop pulse estimation circuit 150. In some embodiments, the convolution filter circuit 154 convolves the X target 152 with the detected output 164 from loop detector circuit 162 to yield the target filtered output 156. Target filtered output 156 is an X ideal, an ideal approximation of X samples 110. Target filtered output 156 is provided to summation circuit 160 where it is subtracted from X samples 110 to yield the X errors 146.

Again, the adaptive IIR notch filter-based narrowband detection and removal circuit 112 can detect sinusoidal interference in X samples 110 based directly on the X samples 110, on the X errors 146, or in some embodiments, selectably based on either X samples 110 or X errors 146.

Figure 2:
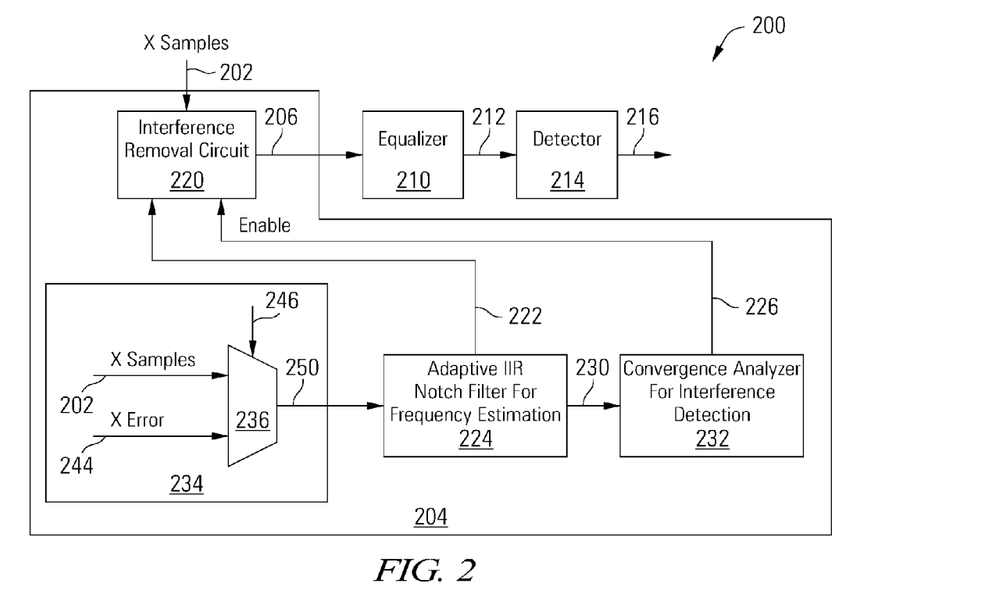
FIG. 2 depicts an adaptive notch filter-based narrowband interference detection and removal circuit in accordance with some embodiments of the present invention.

Turning now to FIG. 2, an adaptive notch filter-based narrowband interference detection and removal circuit 200 is depicted in accordance with some embodiments of the present invention. X samples 202 are provided to an interference removal circuit 220 in adaptive notch filter-based narrowband interference detection and removal circuit 200. If the interference is detected by adaptive notch filter-based narrowband interference detection and removal circuit 200, enable signal 226 will enable the interference removal circuit 220, causing it to remove the estimated interference 222 from the X samples 202, yielding clean X samples 206. If the X samples 202 do not contain narrowband sinusoidal interference, the enable signal 226 will disable the interference removal circuit 220, causing it to pass the X samples 202 through as clean X samples 206. In some embodiments, the estimated interference 222 comprises a frequency value or related parameter that can be used to configure a notch filter in interference removal circuit 220. In some other embodiments, the estimated interference 222 comprises a reconstructed or estimated version of the sinusoidal interference that can be subtracted from the X samples 202 by interference removal circuit 220.

An adaptive IIR notch filter 224 estimates the frequency of interference in an input signal 250, yielding estimated interference 222. The input signal 250 can be X samples 202 or X errors 244, or a selection between X samples 202 and X errors 244 in various embodiments. In some embodiments in which both X samples 202 and X errors 244 are available, a selection circuit 234 can be provided, such as, but not limited to, a multiplexer 236 controlled by a select signal 246 to select either X samples 202 or X errors 244 as input signal 250 to the adaptive IIR notch filter 224. In some other embodiments, just one of X samples 202 or X errors 244 is provided to adaptive IIR notch filter 224. The X errors 244 result in better accuracy in the estimated interference 222 from adaptive IIR notch filter 224, although in some embodiments, the calculation of X errors based on X samples can increase the latency.

In some embodiments, the adaptive IIR notch filter 224 adapts a parameter $\theta_1$ representing the frequency of the estimated interference 222, based on a step size $\mu(n)$ and a notch width $\theta_2$. The step size $\mu(n)$ and notch width $\theta_2$ are provided as parameters to adaptive IIR notch filter 224 in some embodiments. In other embodiments, step size $\mu(n)$ and notch width $\theta_2$ are controlled by adaptive IIR notch filter 224, either with fixed or varying values.

The adaptive IIR notch filter 224 also provides an estimated frequency 230 of interference to a convergence analyzer 232. The convergence analyzer 232 monitors the estimated frequency 230 over time as it is provided by the adaptive IIR notch filter 224 to determine whether the estimated frequency 230 constantly changes over time or whether it converges to a particular frequency value, which is the frequency of the narrowband sinusoidal interference. If the convergence analyzer 232 determines that the estimated frequency 230 has converged, it asserts the enable signal 226. If the convergence analyzer 232 determines that the estimated frequency 230 is diverging, it deasserts the enable signal 226.

Figure 3:
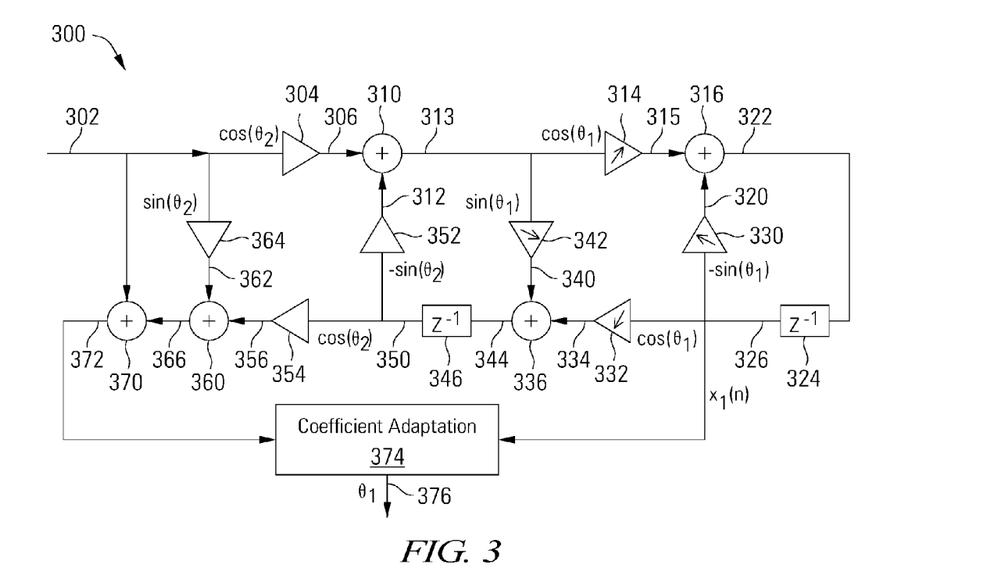
FIG. 3 depicts an adaptive infinite impulse response notch filter in accordance with some embodiments of the present invention.

Turning now to FIG. 3, an adaptive infinite impulse response notch filter 300 is depicted in accordance with some embodiments of the present invention. An input signal 302, either X samples or X errors, is provided to the adaptive infinite impulse response notch filter 300, and an adaptive parameter 376 $\theta_1$ is generated, from which the estimated frequency of the narrowband interference can be derived.

A multiplier 304 multiplies the input signal 302 by $\cos(\theta_2)$, where $\theta_2$ is the notch width, a fixed parameter determined by the 3 dB rejection bandwidth BW according to the following equation:

$$\sin(\theta_2) = \frac{1 - \tan(BW/2)}{1 + \tan(BW/2)} \qquad (\text{Eq 1})$$

Output 306 of multiplier 304 is added to signal 312 in adder 310, yielding output 313, which is multiplied by $\cos(\theta_1)$ in multiplier 314 to yield output 315. Adaptive parameter 376 $\theta_1$ is generated in a coefficient adaptation circuit 374. The output 315 is added to signal 320 in adder 316, yielding signal 322, which is delayed in delay element 324. In some embodiments, delay element 324 is a digital one tap delay, delaying its input by one clock period.

Filtered sample $x_1(n)$ 326 is multiplied by $-\sin(\theta_1)$ in multiplier 330, yielding signal 320. Filtered sample $x_1(n)$ 326 is also multiplied by $\cos(\theta_1)$ in multiplier 332, yielding signal 334. Signal 313 is multiplied by $\sin(\theta_1)$ in multiplier 342, yielding signal 340. Signals 334 and 342 are added in adder 336, yielding signal 344, which is delayed in digital one-tap delay element 346 to produce delayed signal 350. Signal 350 is multiplied by $-\sin(\theta_2)$ in multiplier 352, yielding signal 312. Signal 350 is also multiplied by $\cos(\theta_2)$ in multiplier 354, yielding signal 356. Input signal 302 is multiplied by $\sin(\theta_2)$ in multiplier 364, yielding signal 362 which is added to signal 356 in adder 360, yielding signal 366. Input signal 302 is added to signal 366 in adder 370, yielding adaptive filter error e(n) 372.

The coefficient adaptation circuit 374 adapts the adaptive parameter 376 $\theta_1$ based on the filtered sample $x_1(n)$ 326 and the adaptive filter error e (n) 372 according to the following equation:

$$\theta_1(n+1)=\theta_1(n)-\mu(n)e(n)x_1(n) \quad \text{(Eq 2)}$$

where $\mu(n)$ denotes the step size. Again, the step size $\mu(n)$ can be dynamically controlled or can be fixed. A larger step size $\mu(n)$ causes the coefficient adaptation circuit 374 to converge quickly, but can leave a larger error in the adaptive parameter 376 $\theta_1$. A smaller step size $\mu(n)$ results in lower errors but converges more slowly. In some embodiments, the step size $\mu(n)$ is varied during frequency estimation, assigning a relatively large value initially and gradually reducing it to increase the speed of convergence while yielding good results.

The notch frequency estimate $\omega_0$ can be used as the estimated frequency of the narrowband interference, obtained according to the following equation:

$$\omega_0 = \theta_1 + \frac{\pi}{2} \quad \text{(Eq 3)}$$

The adaptive infinite impulse response notch filter 300 and other elements of adaptive notch filter-based narrowband interference detection and removal circuit 200 can be operated either in always-on, real-time mode as data samples are processed, or in retry mode, for example when data fails to converge in a decoder (e.g., 132). When data fails to converge, a retry mode can be initiated in a read channel, either re-reading a data sector and reprocessing it or reprocessing a previously read and buffered data sector. By operating the adaptive notch filter-based narrowband interference detection and removal circuit 200 only in retry mode when a large number of errors remain after decoding, power consumption in the read channel is reduced.

Figure 4:
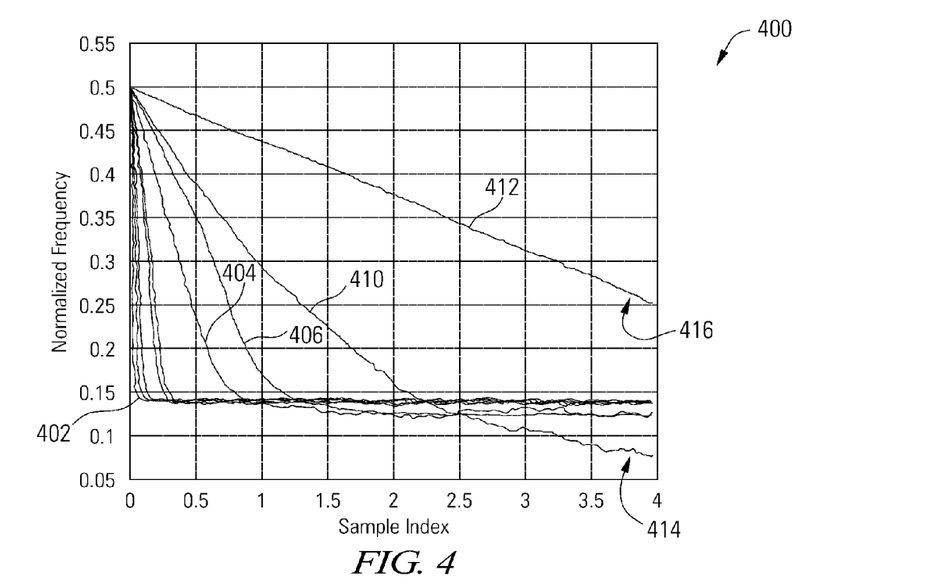
FIG. 4 is a plot depicting convergence and non-convergence examples from an adaptive filter-based narrowband interference detector in accordance with some embodiments of the present invention.

Examples of convergence and non-convergence in the estimated frequency from an adaptive filter-based narrowband interference detector are depicted in plot 400 of FIG. 4 in accordance with some embodiments of the present invention. The normalized frequency of any narrowband interference corresponds with the Y-axis of plot 400, and the data sample index corresponds with the X-axis. In this example, the true normalized frequency 402 of the narrowband interference is about 0.14. Plot 400 shows the normalized estimated frequency of the interference for a number of different interference signal amplitudes, with the estimation made based on both X samples and X errors for each interference signal amplitude. For example, trace 404 is the normalized estimated frequency of interference having a normalized amplitude of 0.05, generated using X samples, while trace 406 is generated using X errors for the same interference. Notably, the frequency can be estimated more accurately using X errors than using X samples, at the expense of a higher latency. In both cases, traces 404, 406 converge on about the true normalized frequency 402 after some delay.

The plot 400 also shows a pair of traces 410, 412 representing the normalized estimated frequency of the interference signal when the amplitude of the interference signal is zero, in other words, when there is no interference. Trace 410 is calculated using X samples, trace 416 using X errors. Notably, traces 410, 412 do not converge on the true normalized frequency 402, rather, they diverge (see 414, 416) from frequency 402. This convergence or divergence is used in a convergence detector (e.g., 232) to determine whether interference exists to enable or disable an interference removal circuit (e.g., 220). As shown in the simplified plot 500 of FIG. 5, the estimated frequency 504 from the adaptive notch filter (e.g., 224) converges in the presence of narrowband interference, resulting in a substantially flat or zero slope. The estimated frequency 502 from the adaptive notch filter (e.g., 224) diverges in the absence of narrowband interference, resulting in a non-zero slope.

Figure 5:
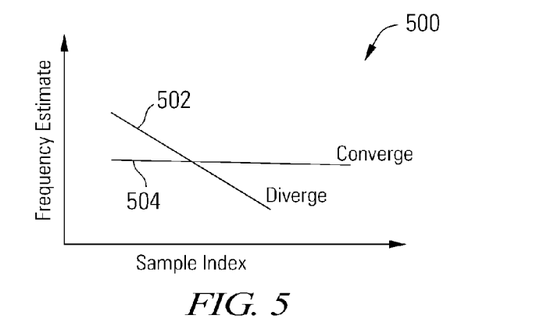
FIG. 5 depicts an estimated frequency generated by an adaptive filter-based narrowband interference detector showing convergence and divergence for cases with and without interference in accordance with some embodiments of the present invention.

Mathematically, the convergence detection can be described as a discrimination between a flat curve and a non-flat curve. In some embodiments, the convergence detector (e.g., 232) distinguishes between these curves using a differential accumulator, the output of which is zero if the estimated frequency converges, while a non-zero output occurs when the estimated frequency diverges.

Figure 6:
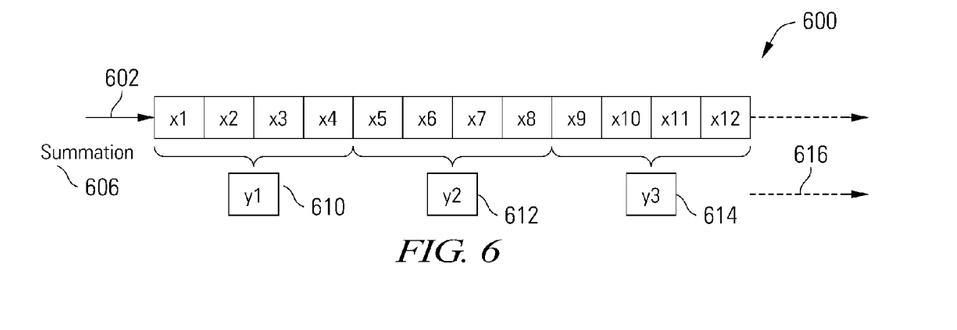
FIG. 6 depicts a differentiating accumulation of interference frequency estimates used in detecting convergence in accordance with some embodiments of the present invention.

Turning to FIG. 6, a diagram 600 depicts a differentiating accumulation of interference frequency estimates used in detecting convergence in accordance with some embodiments of the present invention. A series of frequency estimates 602 (e.g., X1 . . . X12) are summed over a window, in this example case, having a summation window length of 4. The summation 606 yields a summation sequence 616 including summation values (e.g., Y1 610, Y2 612, Y3 614 . . . ). A windowed summation of the frequency estimates is thus generated. The summation sequence is then differentiated, subtracting summation values that are separated or differentiated by a lag. The differentiation lag should be sufficiently large as to amplify the variation amount, such as, but not limited to, a lag of 200. For example, given a lag of 200, the summation sequence is differentiated by subtracting summation value Y1 from summation value Y201, then subtracting summation value Y2 from summation value Y202, subtracting summation value Y3 from summation value Y203, and so on. The resulting sequence is provided to a first order accumulator that operates as a lowpass filter, having a transfer function as follows:

$$H(z) = \frac{1}{1-\gamma z^{-1}} \quad \text{(Eq 4)}$$

where $\gamma$ can be, but is not limited to, a value such as 0.9.

The output of the first order accumulator is compared with a threshold to determine whether the frequency estimate has converged, meaning that narrowband interference exists in the data. If interference exists, the frequency estimate will converge, resulting in a flat slope and a zero value in the first order accumulator in the convergence detector. If no interference exists, the frequency estimate will vary over time, resulting in a non-flat slope and a non-zero value in the first order accumulator in the convergence detector.

Figure 7:
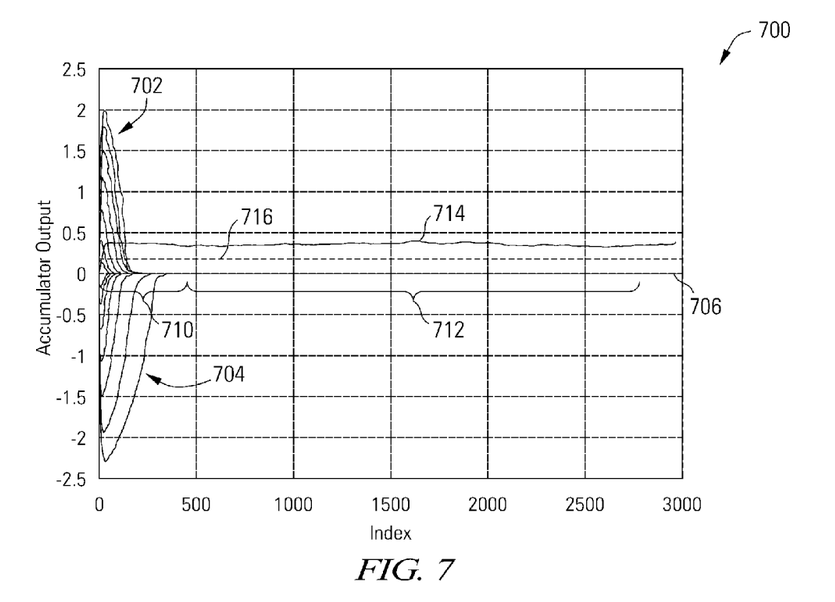
FIG. 7 is a plot depicting accumulator outputs over time for a differentiating accumulation of interference frequency estimates showing cases with and without interference in accordance with some embodiments of the present invention.

Turning to FIG. 7, a plot 700 depicts the output of the first order accumulator in the convergence detector over a data sector. The Y-axis corresponds with the output of the first order accumulator, and the X-axis corresponds with the index of the differentiated summation values. The accumulator output 702, 704 for frequency estimates when narrowband interference exists in the data initially varies as the frequency estimates change, but then becomes zero 706 after a transient period 710. The accumulator output 714 when no narrowband interference remains at a non-zero value, showing that the frequency estimate continues to change. The accumulator output in the convergence detector is compared with a threshold 716 to distinguish between substantially zero values 706 and non-zero values 714. The comparison with the threshold 716 is performed during a steady state period 712 after the transient period 710 to allow the frequency estimate to converge. In some examples, the transient period 710 is set to about ¼ sector.

Figure 8:
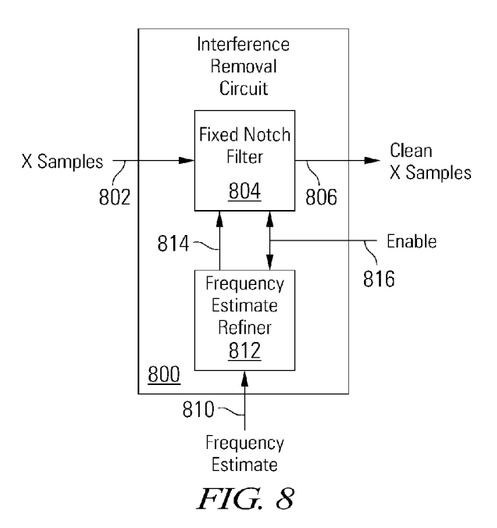
FIG. 8 depicts an interference removal circuit including an estimate refiner in accordance with some embodiments of the present invention.

Turning now to FIG. 8, an interference removal circuit 800 including a frequency estimate refiner 812 is depicted in accordance with some embodiments of the present invention. X samples 802 are provided to a fixed notch filter 804 in the interference removal circuit 800, which yields clean X samples 806. A frequency estimate 810 for the narrowband interference is obtained, for example, from an adaptive IIR notch filter (e.g., 224).

A frequency estimate refiner 812 refines the frequency estimate 810, yielding a refined frequency estimate 814 that is used to configure the fixed notch filter 804. When thus configured, the fixed notch filter 804 filters the narrowband interference from X samples 802, yielding clean X samples 806. An enable signal 816 is obtained, for example, from a convergence analyzer 232, enabling the frequency estimate refiner 812 and the fixed notch filter 804 when narrowband interference is detected in X samples 802, and disabling the frequency estimate refiner 812 and the fixed notch filter 804 when narrowband interference is not detected in X samples 802. When disabled, the fixed notch filter 804 passes X samples 802 through unchanged as clean X samples 806.

The frequency estimate refiner 812 is operable to remove or reduce noise in the frequency estimate 810, using any suitable circuit or algorithm. For example, in some embodiments, the frequency estimate refiner 812 averages samples in the frequency estimate 810, averaging any suitable number of successive samples from two to greater numbers. Based upon the disclosure provided herein, one of ordinary skill in the art will recognize a variety of circuitry that may be included as part of frequency estimate refiner 812.

The fixed notch filter 804 has a transfer function as follows in some embodiments:

$$H_{fixed}(z) = \frac{1 - 2\cos(2\pi f_0)z^{-1} + z^{-2}}{1 - 2\rho\cos(2\pi f_0)z^{-1} + \rho^2 z^{-2}} \quad \text{(Eq 5)}$$

where $f_0$ denotes the normalized frequency for the notch bottom, also referred to as the notch point, set by the adaptive notch filter (e.g., 224), and where ρ determines the distance from poles to unit circle, where 0<ρ<1. The 3 dB rejection bandwidth for the notch frequency is given by BW=π(1−ρ). A large ρ corresponds with a deep-narrow notch while a small ρ corresponds with a shallow-fat notch. A deep-narrow notch can greatly attenuate the interference if the frequency is exactly known. However, the removal performance can sharply degrade if frequency error is considerable. In contrast, a fat-shallow notch can handle more frequency uncertainty, but its performance is not as good as a deep-narrow notch if the frequency is exact.

Figure 9:
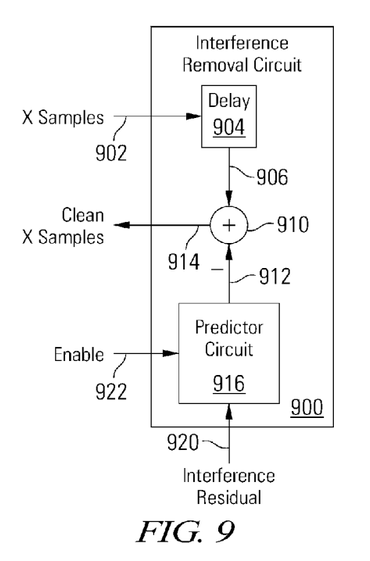
FIG. 9 depicts another interference removal circuit including an interference signal predictor in accordance with some embodiments of the present invention.

Turning now to FIG. 9, another interference removal circuit 900 including an interference signal predictor 916 is depicted in accordance with some embodiments of the present invention. X samples 902 are provided to a delay circuit 904 and a summation circuit 910, which yields clean X samples 914. A predictor circuit 916 generates a smoothed reconstructed interference signal or smoothed reconstructed sinusoid 912 representing or mirroring the narrowband interference so that it can be subtracted in summation circuit from delayed X samples 906 to yield clean X samples 914. The interference residual 920 provided to the predictor circuit 916 can be obtained, for example, from an adaptive IIR notch filter (e.g., 224). The interference residual 920 is the estimate of the sinusoid interference based on the X errors. The predictor circuit 916 smooths the reconstructed sinusoid in interference residual 920 when enabled by enable signal 922 from converge detector (e.g., 232). The delay circuit 904 aligns the delayed X samples 906 with the smoothed reconstructed sinusoid 912, based on the latency in detecting and estimating the narrowband interference based on X errors.

Figure 10:
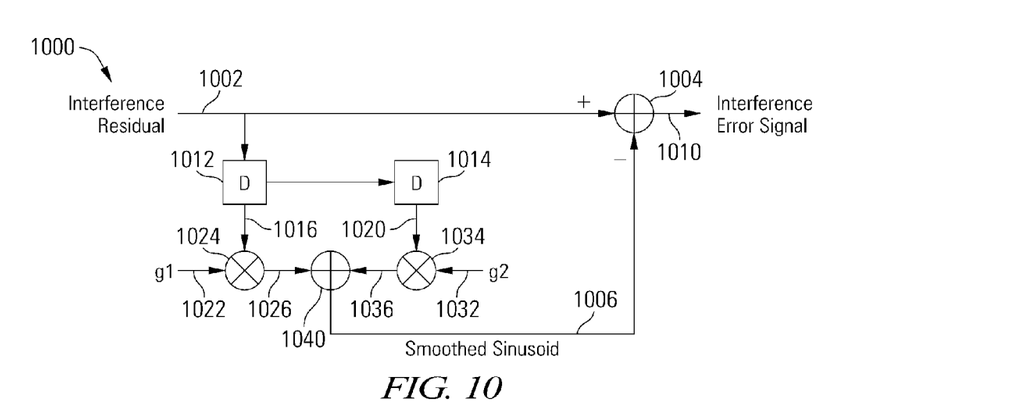
FIG. 10 depicts an interference signal predictor in accordance with some embodiments of the present invention.

Turning now to FIG. 10, an interference signal predictor 1000 is depicted in accordance with some embodiments of the present invention. The interference signal predictor 1000 can be used in place of predictor circuit 916 in some embodiments. In some embodiments, as in FIG. 10, the interference signal predictor 1000 is a two-tap adaptive filter. In some embodiments, the adaptation of the tap coefficients 1022, 1032 is implemented using a least mean square algorithm. An interference residual 1002 is received, for example from the adaptive notch filter (e.g., 224), as an estimate of the interference sinusoid based on X errors. The interference residual 1002 is delayed in delay elements 1012, 1014, yielding once-delayed residual 1016 and twice-delayed residual 1020. The delayed residuals 1016, 1020 are multiplied by tap coefficients 1022, 1032 in multipliers 1024, 1034, yielding scaled delayed residuals 1026, 1036, respectively. The scaled delayed residuals 1026, 1036 are added in summation circuit 1040, yielding smoothed sinusoid 1006, which is subtracted from the interference residual 1002 in summation circuit 1004, yielding the interference error signal 1010.

Figure 11:
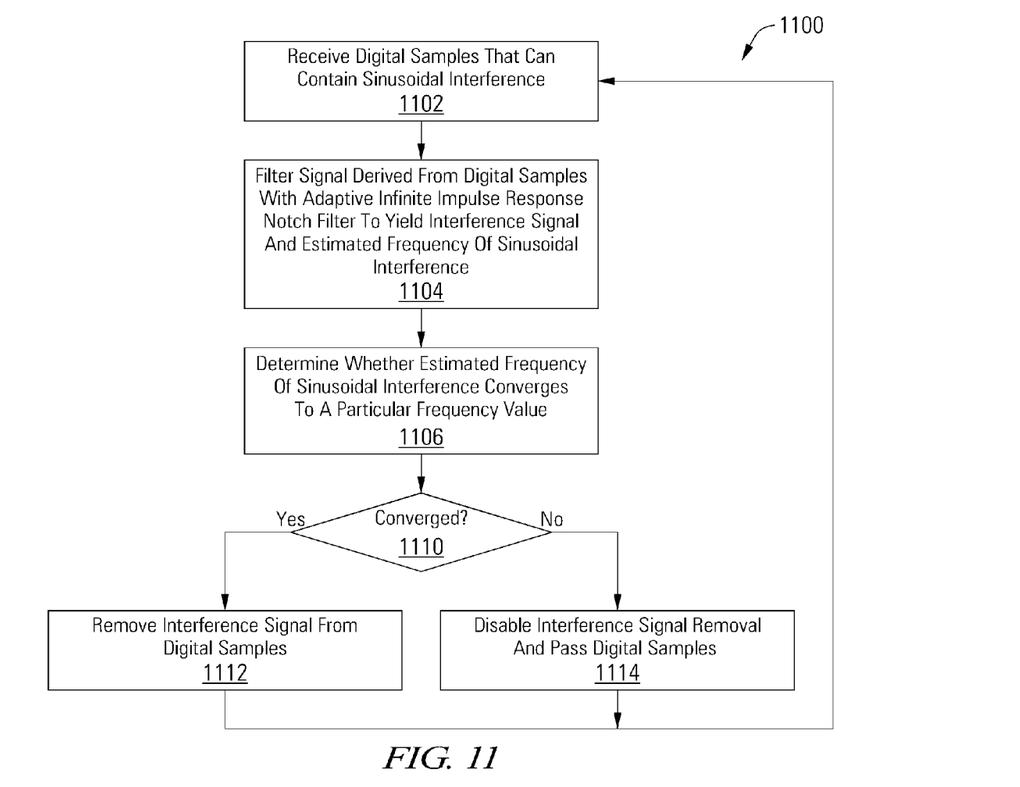
FIG. 11 is a flow diagram showing a method for detecting and removing narrowband interference in accordance with some embodiments of the present invention.

Turning to FIG. 11, flow diagram 1100 shows a method for detecting and removing narrowband interference in accordance with some embodiments of the present invention. Following flow diagram 1100, digital samples are received that might contain sinusoidal interference. (Block 1102) In some embodiments, the existence of the interference is not known in advance, nor when it might occur, nor its frequency. A signal derived from the digital samples is filtered with an adaptive IIR notch filter to yield an interference signal and an estimated frequency of sinusoidal interference. (Block 1104) In some embodiments, the signal filtered by the adaptive IIR notch filter comprises X samples from an analog to digital converter. In some embodiments, the signal filtered by the adaptive IIR notch filter comprises X errors corresponding to X samples from an analog to digital converter. It is determined whether the estimated frequency of sinusoidal interference converges to a particular frequency value. (Block 1106) In some embodiments, this is performed by accumulating the estimated frequency values and comparing the frequency values accumulated at different times, with some separation in sample values corresponding with the compared frequency values. If the estimated frequency converges as determined in Block 1110, the interference signal is removed from the digital samples. (Block 1112) If the estimated frequency does not converge as determined in Block 1110, the interference signal removal is disabled, and the digital samples are passed along for further processing, such as data detection and decoding. (Block 1114) Again, if narrowband interference exists in the digital samples, the estimated frequency of the sinusoidal interference will converge to the particular frequency value of the interference.

Figure 12:
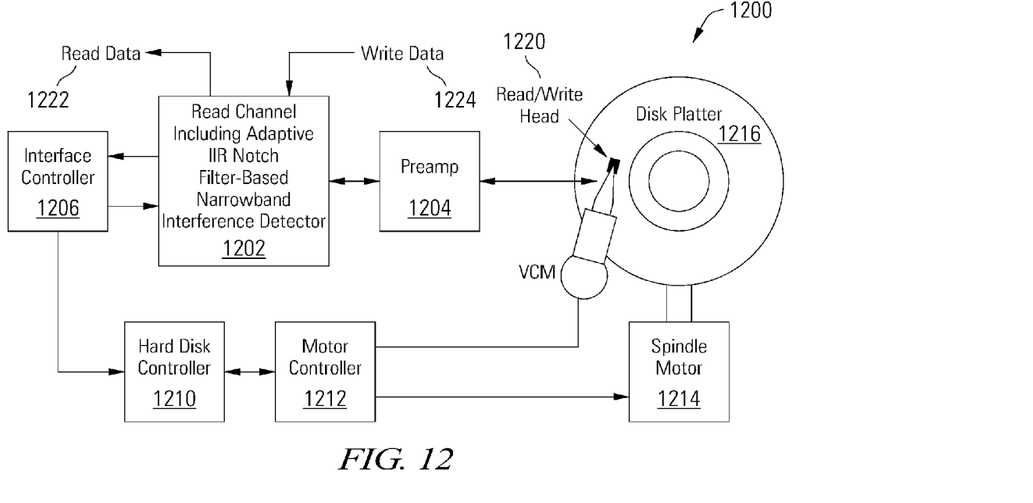
FIG. 12 depicts a storage system including a read channel with an adaptive infinite impulse response (IIR) notch filter-based narrowband interference detection and removal circuit in accordance with some embodiments of the present invention.

Turning to FIG. 12, a storage system 1200 is illustrated as an example application of an adaptive IIR notch filter-based narrowband interference detection and removal circuit in accordance with some embodiments of the present invention. The storage system 1200 includes a read channel circuit 1202 with an adaptive IIR notch filter-based narrowband interference detection and removal circuit in accordance with one or more embodiments of the present invention. Storage system 1200 may be, for example, a hard disk drive. Storage system

1200 also includes a preamplifier 1204, an interface controller 1206, a hard disk controller 1210, a motor controller 1212, a spindle motor 1214, a disk platter 1216, and a read/write head assembly 1220. Interface controller 1206 controls addressing and timing of data to/from disk platter 1216. The data on disk platter 1216 consists of groups of magnetic signals that may be detected by read/write head assembly 1220 when the assembly is properly positioned over disk platter 1216. In one embodiment, disk platter 1216 includes magnetic signals recorded in accordance with either a longitudinal or a perpendicular recording scheme.

In a typical read operation, read/write head assembly 1220 is accurately positioned by motor controller 1212 over a desired data track on disk platter 1216. Motor controller 1212 both positions read/write head assembly 1220 in relation to disk platter 1216 and drives spindle motor 1214 by moving read/write head assembly 1220 to the proper data track on disk platter 1216 under the direction of hard disk controller 1210. Spindle motor 1214 spins disk platter 1216 at a determined spin rate (RPMs). Once read/write head assembly 1220 is positioned adjacent the proper data track, magnetic signals representing data on disk platter 1216 are sensed by read/write head assembly 1220 as disk platter 1216 is rotated by spindle motor 1214. The sensed magnetic signals are provided as a continuous, minute analog signal representative of the magnetic data on disk platter 1216. This minute analog signal is transferred from read/write head assembly 1220 to read channel circuit 1202 via preamplifier 1204. Preamplifier 1204 is operable to amplify the minute analog signals accessed from disk platter 1216. In turn, read channel circuit 1202 digitizes and decodes the received analog signal to recreate the information originally written to disk platter 1216. This data is provided as read data 1222 to a receiving circuit. While processing the read data, read channel circuit 1202 detects, estimates and removes narrowband sinusoidal interference. Such interference detection and removal can be implemented consistent with the disclosure above in relation to FIGS. 2-10. In some embodiments, the interference detection and removal can be performed consistent with a process disclosed above in relation to FIG. 11. A write operation is substantially the opposite of the preceding read operation with write data 1224 being provided to read channel circuit 1202.

It should be noted that storage system 1200 can be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 1200, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that storage system 1200 can be modified to include solid state memory that is used to store data in addition to the storage offered by disk platter 1216. This solid state memory may be used in parallel to disk platter 1216 to provide additional storage. In such a case, the solid state memory receives and provides information directly to read channel circuit 1202. Alternatively, the solid state memory can be used as a cache where it offers faster access time than that offered by disk platter 1216. In such a case, the solid state memory can be disposed between interface controller 1206 and read channel circuit 1202 where it operates as a pass through to disk platter 1216 when requested data is not available in the solid state memory or when the solid state memory does not have sufficient storage to hold a newly written data set. Based upon the disclosure provided herein, one of ordinary skill in the art will recognize a variety of storage systems including both disk platter 1216 and a solid state memory.

Figure 13:
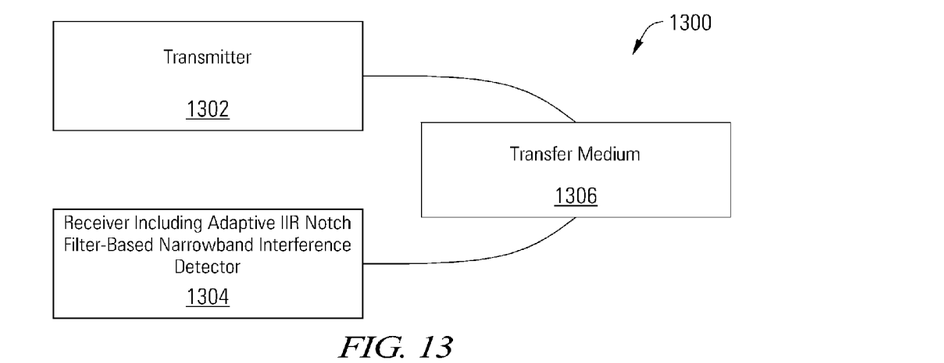
FIG. 13 depicts a wireless communication system including an adaptive IIR notch filter-based narrowband interference detection and removal circuit in accordance with some embodiments of the present invention.

Turning to FIG. 13, a wireless communication system 1300 or data transmission device including a transmitter 1302 and receiver 1304 with an adaptive IIR notch filter-based narrowband interference detection and removal circuit is shown in accordance with some embodiments of the present invention. The transmitter 1302 is operable to transmit data via a transfer medium 1306 as is known in the art. The encoded data is received from transfer medium 1306 by receiver 1304. Receiver 1304 incorporates an adaptive IIR notch filter-based narrowband interference detection and removal circuit. Such interference detection and removal can be implemented consistent with the disclosure above in relation to FIGS. 2-10. In some embodiments, the interference detection and removal can be performed consistent with a process disclosed above in relation to FIG. 11.

Figure 14:
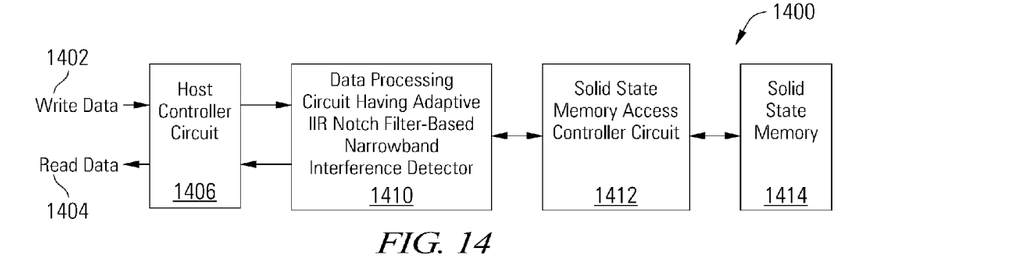
FIG. 14 depicts another storage system including a data processing circuit having an adaptive IIR notch filter-based narrowband interference detection and removal circuit in accordance with some embodiments of the present invention.

Turning to FIG. 14, another storage system 1400 is shown that includes a data processing circuit 1410 having an adaptive IIR notch filter-based narrowband interference detection and removal circuit in accordance with one or more embodiments of the present invention. A host controller circuit 1406 receives data to be stored (i.e., write data 1402). This data is provided to data processing circuit 1410 where it can be further processed or encoded as desired. The data to be written is provided to a solid state memory access controller circuit 1412. Solid state memory access controller circuit 1412 can be any circuit known in the art that is capable of controlling access to and from a solid state memory. Solid state memory access controller circuit 1412 formats the received encoded data for transfer to a solid state memory 1414. Solid state memory 1414 can be any solid state memory known in the art. In some embodiments of the present invention, solid state memory 1414 is a flash memory. Later, when the previously written data is to be accessed from solid state memory 1414, solid state memory access controller circuit 1412 requests the data from solid state memory 1414 and provides the requested data to data processing circuit 1410. In turn, data processing circuit 1410 detects and removes narrowband interference with an adaptive IIR notch filter-based narrowband interference detection and removal circuit. Such interference detection and removal can be implemented consistent with the disclosure above in relation to FIGS. 2-10. In some embodiments, the interference detection and removal can be performed consistent with a process disclosed above in relation to FIG. 11. The data processing circuit 1410 can also perform any needed data decoding for error correction. The resulting data are provided to host controller circuit 1406 where the data is passed on as read data 1404.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/ or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel systems, devices, and methods for adaptive IIR notch filter-based interference detection, estimation and removal. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system comprising:
   an adaptive notch filter operable to estimate an interference frequency in data samples;
   a convergence detector operable to determine whether the interference frequency converges on a value when the data samples contain interference; and
   an interference removal circuit operable to remove the interference from the data samples.

2. The data processing system of claim 1, wherein the interference comprises sinusoidal interference.

3. The data processing system of claim 1, wherein the convergence detector comprises an enable signal output operable to enable the interference removal circuit to remove the interference from the data samples when the interference frequency converges.

4. The data processing system of claim 3, wherein the interference removal circuit is operable to pass the data samples to an output unfiltered when the enable signal is not asserted by the convergence detector.

5. The data processing system of claim 1, wherein the adaptive notch filter is operable to estimate the interference frequency in the data samples by filtering the data samples.

6. The data processing system of claim 1, wherein the adaptive notch filter is operable to estimate the interference frequency in the data samples by filtering error samples corresponding with the data samples.

7. The data processing system of claim 1, wherein the adaptive notch filter comprises an adaptive infinite impulse response notch filter.

8. The data processing system of claim 1, wherein the convergence detector is operable to sum a series of frequency estimates for the interference frequency over a summation window to yield summation values, to subtract pairs of the summation values that are separated by a lag to yield difference values, and to accumulate the difference values to yield an accumulated output.

9. The data processing system of claim 8, wherein the convergence detector is operable to compare the accumulated output with a threshold and determine that the interference frequency converges when the accumulated output is below the threshold.

10. The data processing system of claim 1, wherein the interference removal circuit comprises a fixed notch filter and a frequency estimate refiner operable to smooth an estimated interference signal from the adaptive notch filter.

11. The data processing system of claim 1, wherein the interference removal circuit comprises a predictor circuit operable to generate a reconstructed interference signal representing the interference, and a summation circuit operable to subtract the reconstructed interference signal from the data samples.

12. The data processing system of claim 11, wherein the predictor circuit comprises an adaptive filter.

13. The data processing system of claim 1, further comprising an analog to digital converter circuit operable to sample an analog signal to yield the data samples.

14. The data processing system of claim 1, further comprising an equalizer circuit operable to filter an output of the interference removal circuit.

15. A method for data processing, comprising:
   filtering a signal with an adaptive notch filter to estimate a frequency of interference in digital samples;
   determining whether the estimate of the frequency of the interference converges; and
   removing the interference from the digital samples when the frequency of the interference converges.

16. The method of claim 15, wherein the signal comprises the digital samples.

17. The method of claim 15, wherein the signal comprises error samples, further comprising calculating the error samples by subtracting ideal samples from the digital samples.

18. The method of claim 15, further comprising enabling the removing of the interference when the frequency of the interference converges and disabling the removing of the interference when the frequency of the interference does not converge.

19. The method of claim 15, wherein determining whether the estimate of the frequency of the interference converges comprises summing a series of values for the estimate of the frequency of the interference over a summation window to yield summation values, subtracting pairs of the summation values that are separated by a lag to yield difference values, accumulating the difference values to yield an accumulated output, and comparing the accumulated output with a threshold.

20. A storage device, comprising:
   a storage medium;
   a head assembly disposed in relation to the storage medium and operable to provide a sensed signal corresponding to a data set on the storage medium; and
   a read channel circuit comprising:
   an analog to digital converter circuit operable to convert the sensed signal into a series of corresponding digital samples;
   an adaptive interference detection and removal circuit operable to detect and remove interference from the digital samples to yield clean samples; and
   an equalizer circuit operable to equalize the clean samples, wherein the adaptive interference detection and removal circuit comprises:
   an adaptive notch filter operable to estimate an interference frequency in the digital samples;

a convergence detector operable to determine whether the interference frequency converges on a value when the digital samples contain the interference; and an interference removal circuit operable to remove the interference from the digital samples.

* * * * *